Aug. 16, 1949.  H. E. WEBBER  2,478,956
TILT DETECTOR AND CONTROL FOR GYROSCOPES
Filed July 13, 1943  2 Sheets-Sheet 1

INVENTOR
HUGH E. WEBBER
BY
Herbert H. Thompson
his ATTORNEY.

Aug. 16, 1949.  H. E. WEBBER  2,478,956
TILT DETECTOR AND CONTROL FOR GYROSCOPES
Filed July 13, 1943  2 Sheets-Sheet 2
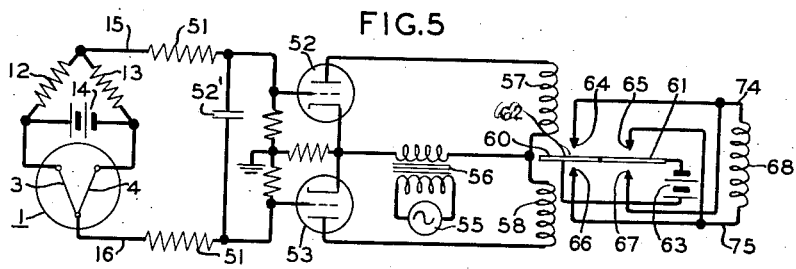
FIG.5
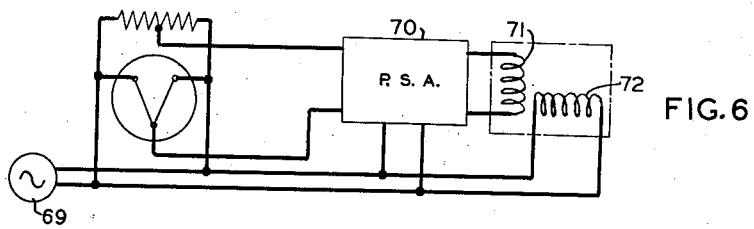
FIG.6
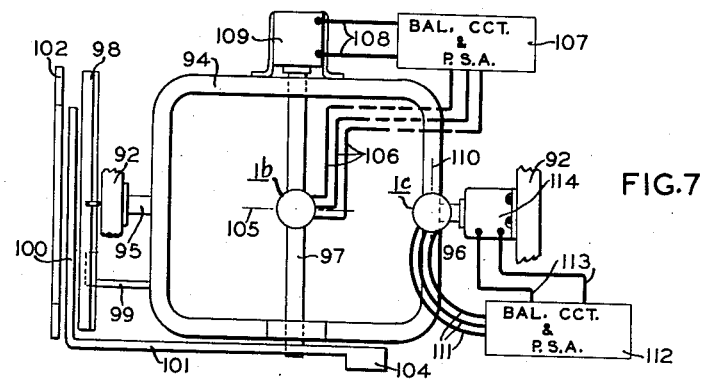
FIG.7
FIG.10  FIG.8  FIG.9
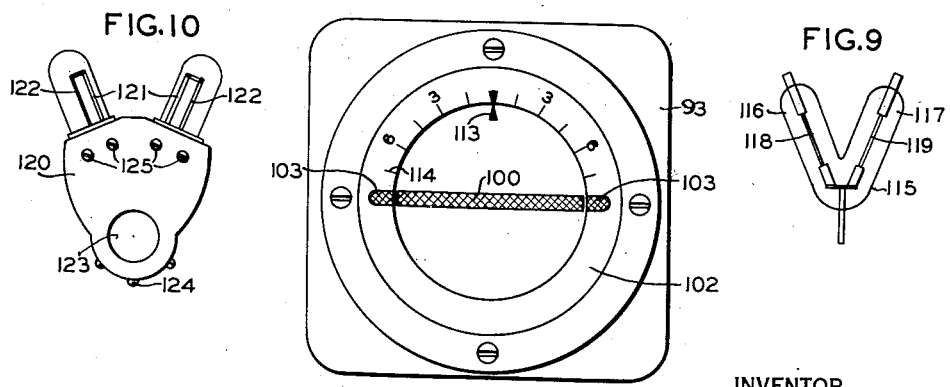
INVENTOR
HUGH E. WEBBER
BY
Herbert P. Thompson
his ATTORNEY.

Patented Aug. 16, 1949

2,478,956

UNITED STATES PATENT OFFICE 2,478,956

TILT DETECTOR AND CONTROL FOR GYROSCOPES

Hugh E. Webber, Williston Park, N. Y., assignor to The Sperry Corporation, a corporation of Delaware Application July 13, 1943, Serial No. 494,579

15 Claims. (Cl. 318—19)

My invention relates to novel means for detecting tilt of a member associated therewith or of itself about an axis relative to vertical, whereby the member may be controlled in orientation or degree of tilt relative to vertical or may be maintained with an axis thereof substantially vertical.

It is a primary object of my invention to provide a novel tilt detecting device which may be used in determining or controlling the position of a member, such as gyroscope or the rotor bearing case thereof, relative to vertical.

It is another object of my invention to provide a tilt-detector comprising an envelope containing an electrical element which will vary in an electrical characteristic thereof as the position of the element relative to vertical is varied.

More particularly, it is an object of my invention to provide a tilt detecting device comprising one or more envelopes containing a pair of resistance elements positioned therein in fixed angular or V relationship, the resistances of which when suitably energized will vary as the positions thereof are varied relative to vertical.

Another object resides in providing an instrument comprising a member or a gyroscope and means including tilt detecting means of the foregoing character for controlling the position of the member or the gyro with respect to vertical or horizontal.

Another object resides in the provision of an instrument comprising a gyro vertical and means including a tilt detector of the above character for erecting said gyro or maintaining the spin axis of the rotor thereof in substantially a vertical position.

Still another object lies in providing an artificial horizon comprising tilt detecting means of the character above pointed out and means controlled thereby for providing an artificial horizon indication or a bank and pitch indication of the craft on which the instrument is mounted.

With the foregoing and still other objects in view, my invention includes the novel tilt detector and the association and combination of elements described below and illustrated in the accompanying drawings, in which:

Fig. 5 is a schematic wiring diagram of one form of phase sensitive amplifier or control circuit for the precessing coils of a gyro including my novel tilt detector;

Fig. 6 is a schematic wiring diagram of a modified form of control circuit;

Fig. 7 is a fragmentary, somewhat schematic, plan view of a modified form of artificial horizon instrument;

Fig. 8 is a front view of the casing of an instrument housing the elements of Fig. 7;

Fig. 9 is a schematic illustration of a modified tube structure; and

Fig. 10 discloses a modified form of tube and socket construction.

While in the following description I have described my invention as comprising a gyro vertical or as including an artificial horizon or similar instrument, it will be understood that the novel tilt detecting means may be employed with any member to maintain a predetermined orientation thereof relative to vertical or to provide an indication of the tilt thereof. Furthermore, the control circuit and tilt detecting means may be employed for maintaining the spin axis of the directional gyro substantially in a horizontal plane. Hence, it will be understood that the drawings, in the main, are intended for exemplary purposes, but also to illustrate preferred embodiments of my invention.

Figure 1:
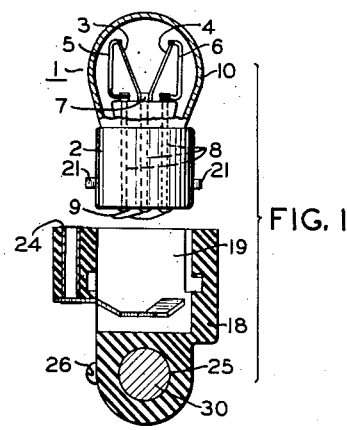
Fig. 1 is an exploded view of one embodiment of the acceleration-sensitive element of my tilt detecting means and a supporting socket therefor.

Referring first to Fig. 1 wherein I have illustrated one form of my novel tilt detecting device or the acceleration-sensitive element thereof, I indicates generally a tube comprising an envelope 10, provided with a base 2, and containing therewithin a pair of electrical resistance elements 3 and 4. In the embodiment illustrated, terminal supports 5 and 6 serve to support the resistance elements at one end thereof while the other ends of the elements are electrically connected together at the terminal 7. It will be understood that suitable resilient or spring connectors may be employed in fastening the resistance elements to the supports associated with both ends thereof so that under substantially all operating conditions the resistance elements or wires will be maintained substantially straight.

The terminal supports 5 and 6 and terminal 7 are electrically connected respectively by means of conductors 8 to exterior terminals 9 in the bottom of the base 2. The terminals 9 are adapted to connect the resistance elements 3 and 4 in a balancing or bridge circuit such as that illustrated in Fig. 5, wherein the elements 3 and 4 within the envelope 1 are connected in a bridge circuit with the resistors 12 and 13. A battery 14 is connected across one diagonal of the bridge circuit, while the output is obtained through conductors 15 and 16 connected to the terminals of the other diagonal of the circuit. The envelope is filled with a fluid and preferably a gas having a sufficiently high molecular weight as to exhibit appreciable inertia to acceleration forces and in which a substantially stable, vertically rising convection stream may be produced by the resistors 3 and 4 when suitably energized and uninfluenced by accelerations other than the acceleration due to gravity.

Assuming that one resistance element is contained within the envelope and that the envelope contains a gas having the foregoing and other hereinafter pointed out properties, and that the resistance element is energized to an extent sufficient to produce convection currents rising therefrom, and further assume, as in accordance with this invention, that the resistance element is substantially straight and of appreciable length, the convection currents rising from the resistor will move in a vertical direction, assuming no other acceleration forces save acceleration due to gravity. These convection currents will move outwardly at the top of the envelope, cascading downwardly adjacent the walls of the envelope 1 and becoming cooled, and then move inwardly toward the resistance element at the bottom of the envelope. If the resistance element is straight and of appreciable length, for example 1 centimeter, and extends in a vertical direction, the convection stream will flow upwardly along the resistance element, the heat liberated from the lower zones of the resistance element serving to maintain the upper zones thereof at a relatively high temperature. The resistance element therefore under this steady state condition will be of a relatively high, substantially constant value. However, when the longitudinal axis of the resistance element is tilted from a vertical position, the convection stream or currents produced throughout the length thereof will continue to rise vertically and therefore at an angle thereto. If the resistor were to occupy a horizontal position the convection currents would rise perpendicularly therefrom. In this latter position of the resistor, the greatest cooling effect will take place and the resistance of the element will be at a minimum value and appreciably lower as compared to the resistance thereof when in a vertical position.

If, however, a single straight resistance wire were employed, the resistance thereof would vary as its inclination to the vertical varies, but the output of the bridge or balancing circuit in which the resistance element is included would not provide phase distinction. In other words, the voltage across the output of the circuit will not change in a polarity sense where the resistor is tilted or rotated from inclination on one side of the vertical to the other, but only an indication of the magnitude of inclination thereof will be obtained.

Hence, I preferably employ a pair of resistors, as shown in Fig. 1, which are arranged in fixed angular relationship with respect to each other and connected respectively in two of the arms of a bridge circuit, as shown in Fig. 5. With this arrangement, if the resistance elements tilt in a plane including the pair thereof and about an axis normal to said plane, tilt of the bisector of the angle formed between said resistors from vertical in one direction will produce a signal voltage in the output of the bridge circuit of one polarity while tilt of said bisector from vertical in the opposite direction will produce a signal voltage output of the opposite polarity.

Furthermore, it will be noted that if the two resistors were to pivot about a horizontal axis lying in the plane including the pair thereof, the resistances of each would vary to the same degree and therefore no signal voltage output or change therein would be produced by the bridge circuit associated therewith.

Figure 3:
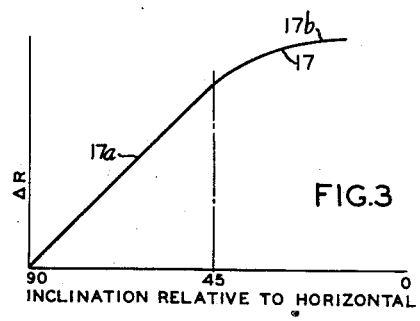
Fig. 3 illustrates a typical characteristic curve for one of the acceleration-sensitive resistance elements included in the tilt detecting means.

The curve 17 in Fig. 3 represents the change in resistance which a single straight resistance element or wire will experience when mounted within an envelope containing a fluid of the character contemplated in this invention and when its longitudinal axis is positioned at various degrees of inclination relative to the horizontal. It will be observed from an examination of this curve that the change in resistance of the resistance wire as it is inclined from a vertical position to a 45° position is substantially linear per unit of angular tilt thereof. However, the change in resistance is not proportionally so large as the wire element is moved from a 45° position to a horizontal position. The portion 17a of the curve represents the linear relationship, while portion 17b thereof discloses the progressively smaller changes in resistance which the wire experiences as it approaches a horizontal position. Therefore, I prefer to arrange the two resistance elements 3 and 4 at an angle of approximately 45° with respect to each other so that under normal operating conditions they will operate on the linear portion 17a of the curve 17, thereby providing maximum differential changes or maximum signal voltages per unit of angular movement thereof relative to vertical about their pivotal axis.

When the resistance elements are suitably energized the values of the resistances thereof depend upon the temperatures thereof and the relationship which the resistors bear to the convection stream produced thereby in the gas within the envelope. I prefer, therefore to use resistance elements formed of material having a high temperature coefficient of resistivity. In practice, I have used tungsten resistors, although other suitable resistors may be used as, for example, platinum. Furthermore, the resistors are preferably of small cross-sectional areas in order to provide an extremely sensitive instrument. For example, tungsten wires of approximately 0.0005 inch in diameter provide favorable results, and, if desired, wires of smaller diameter such as platinum wires of a diameter of 0.00005 inch may be employed. Also, for maximum sensitivity, the resistors are preferably operated at a temperature within the temperature range of about 800° to 1200° C.

The fluid with which the envelope is filled, as hereinbefore indicated, is preferably a gas and one of high molecular weight and capable of exhibiting sufficient inertia to acceleration forces as to provide a convection stream rising vertically therein in a substantially stable manner from the resistors when subjected only to the acceleration of gravity and thereby to affect an appreciable variation in the resistance of the resistance elements when their angular orientation relative to vertical is varied. To obtain the foregoing and in order that no appreciable chemical reaction takes place between the gas and the resistors, I prefer to use an inert gas, such as one taken from the group consisting of helium, neon, argon, krypton and xenon. The molecular weights of these gases are of greater value in the order thereof above named. Furthermore, nitrogen, being substantially an inert gas, could also be used. Other relatively heavy gases could also be used provided they are selected with the chemical nature of the resistance elements in mind and so that chemical reaction therebetween will not occur and thereby appreciably diminish the useful life of the tube.

It should also be noted that the sensitivity of my inclinometer or the magnitude of the signal voltage output per unit of change in tilt thereof also depends upon the pressure of the gas within the envelope. Appreciable results have been produced using argon gas under a pressure of about one-quarter of an atmosphere, although much better results are obtained when the gas pressure is about one atmosphere and, of course, still better results are obtained under still higher gas pressures. Hence, the best operating conditions so far as the gases and gas pressures are concerned, will depend upon the molecular weight of the gas and also the pressure thereof within the envelope. Mixtures of the above mentioned gases may be employed. Furthermore, hydrogen gas, which has high thermal conductivity properties, or a suitable gas having such high properties may also be included with one or a mixture of the gases of heavier molecular weight and the response of the device to acceleration forces or to changes in inclination thereof will be rendered appreciably more sensitive.

The envelope may be formed of metal or glass. In one instance, I have used a generally cylindrical glass envelope containing tungsten resistance elements about 1 centimeter in length and of a diameter of 0.0005 inch, the envelope being filled with argon gas under a pressure of approximately one atmosphere. When one of these resistance elements is included in a bridge circuit and the bridge balanced with the wire resistor in a vertical position, inclination of the wire at an angle of 45° to vertical produces an output or meter reading of approximately 200 microamperes.

In accordance with my invention, I propose to employ an inclinometer comprising a balancing or bridge circuit having a tube of the character illustrated in Fig. 1 connected therein for detecting tilt of a gyro or other member relative to vertical and to control the orientation of the gyro or member thereby, whereby a vertical or horizontal reference is obtained. Accordingly, the socket for the tube of Fig. 1 is designed to support the tube upon one of the supporting journals for the rotor bearing case of the gyro or gimbal ring. However, it will of course be understood that the tube or tubes may be supported directly on the rotor bearing case. Furthermore, one envelope may be employed to house two pairs of relatively angularly disposed resistance elements, each pair lying in mutually perpendicular planes.

Figure 2:
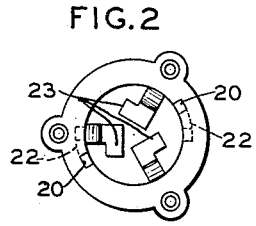
Fig. 2 is a plan view of the socket of Fig. 1.

Referring to Figs. 1 and 2, the tube support or socket 18, which is illustrated as of the bayonet type, is provided with a recess 19 adapted to receive the base 2 of the tube. Diametrically opposed, vertically extending slots 20 are provided in the receptacle 18 to receive the lugs 21 of the base 2 of the tube and circumferentially extending grooves 22 communicating with the slots 20 at the base thereof serve to receive said lugs when the tube is turned whereby securely to lock the tube within the socket. Resilient contacts 23 serve to engage the contacts 9 on the base 2 of the tube and, at the same time, prevent relative movement between the tube and the socket after the lugs 21 of the tube engage with the closed ends of the circumferential slots 22. Electrical connections to the resilient contacts 23 may be made at respective terminals 24 on the exterior of the receptacle but which are electrically connected with the respective spring contacts. The base of the receptacle 18 is provided with an opening 25 therein which is designed to receive one of the trunnions about which the gyroscope illustrated in Fig. 4 may tilt relative to vertical as, for example, trunnion 30. The receptacle may be secured to the trunnion by means of the set screw 26 so that the bisector of the angle between the resistors 3 and 4 may be aligned with the spin axis of the rotor within the rotor bearing case.

Figure 4:
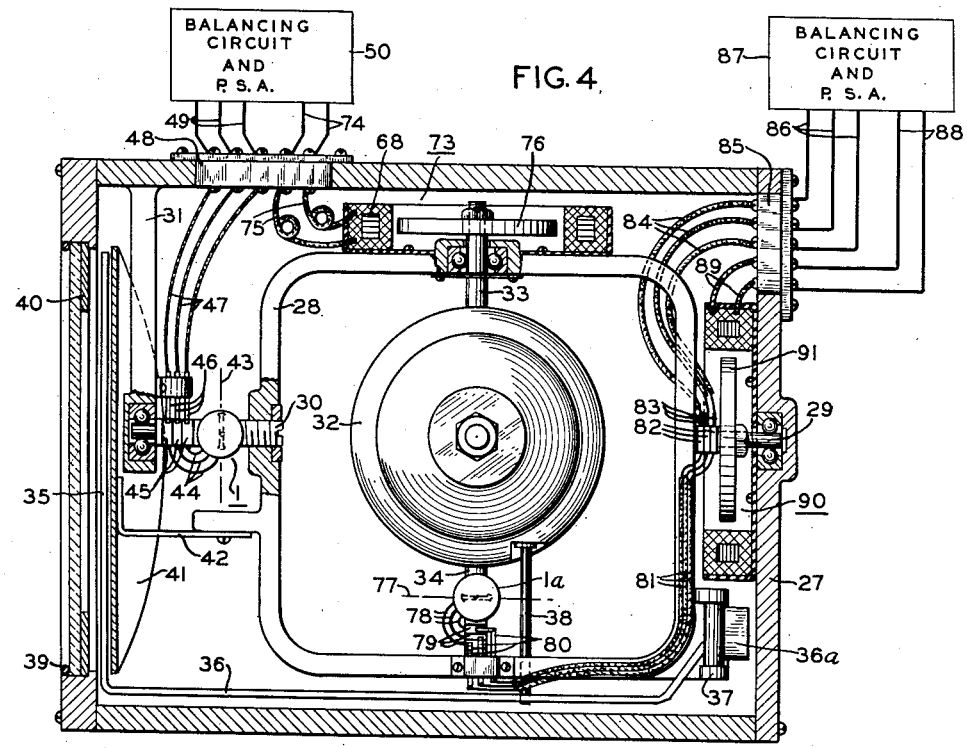
Fig. 4 is a sectional plan view, somewhat schematic in parts, of an artificial horizon instrument.

Referring now to Fig. 4, 27 indicates generally the casing of the gyroscopic instrument which, in the embodiment illustrated, constitutes an artificial horizon instrument. A gimbal ring 28 is pivotally supported on one side by trunnion 29 journaled in a suitable bearing in the casing 27, and on the other side by trunnion 30 journaled in a bracket 31 projecting from the side of the case 27. The axes of trunnions 29 and 30 are coincident and provide one of the axes about which the rotor bearing case 32 may pivot. The rotor bearing case in turn is pivotally mounted to rotate in the gimbal ring by means of trunnions 33 and 34, the coincident axes of which lie normal to the axes of trunnions 29 and 30. In the embodiment herein shown, the trunnions 29 and 30 rotate with the gimbal ring and the trunnions 33 and 34 rotate with the rotor bearing case 32.

An horizon bar 35, which extends across the window in the face of the instrument, is secured to or formed integral with arm 36 which in turn is pivotally supported at 37 on the gimbal ring 28, a counter-balancing weight 36a being connected therewith. As hereinafter described in connection with Fig. 8, the horizon bar 35 cooperates with fixed lubber lines on a dial which is fastened to the casing and functions to provide an indication of pitch of the craft, while at the same time, it may give an indication of bank or roll. An arm 38 secured to and projecting from the rotor bearing case 32 passes through a slot (not shown) in the gimbal ring 28 and engages arm 36 to impart pivotal movement thereto about its pivotal support 37 when the rotor bearing case and case 27 relatively rotate about the axes of trunnions 33 and 34.

The face of the instrument is arranged in the usual manner and comprises an opening 39 through which scale 40 and horizon bar 35 may be observed as shown in Fig. 8; and a mask 41 positioned behind the bar 35 is supported by bracket 42 fixed to the gimbal ring.

In accordance with my invention, one of the tubes containing the resistance elements 3 and 4, as indicated generally at 1, is secured to trunnion 30 preferably in such manner that the plane represented by the dot-dash line 43 which includes the two resistance elements lies substantially normal to the axis of the trunnion 30. Furthermore, the tube 1 is so secured that the bisector of the angle between the resistors therein extends vertically when the spin axis of the gyro rotor within the case 32 extends vertically, so far as movement thereof about the axes of trunnions 29 and 30 is concerned.

The socket 18 is electrically connected through conductors 44 to slip rings 45 which, in turn, are engaged by brushes 46 mounted on the bracket 31. These brushes are connected through conductors 47 to terminal block 48 where they are electrically connected through conductors 49 to resistors 12 and 13 forming a bridge or balancing circuit for the resistors in the tube and a phase sensitive amplifier indicated generally at 50.

One embodiment of a suitable phase sensitive amplifier is illustrated in Fig. 5. As hereinbefore described, the bridge circuit comprises the resistors 12 and 13 and the resistors 3 and 4 of tube 1. A battery 14 serves to energize the circuit including the resistors 3 and 4, and any unbalance of the circuit provides a signal voltage across the output conductors 15 and 16. Since this tilt detecting arrangement is relatively very sensitive even to small angular movements of the tube 1 about a horizontal axis, I prefer to use an integrating circuit in the output thereof which comprises resistors 51 and condenser 52' so that the output of the bridge circuit proper will be integrated or averaged over a time period and supplied to the grids of the two electron tubes 52 and 53. In this manner, signal voltages of relatively short duration will not produce a gyro precessing operation of the torque motors controlled by the phase sensitive amplifier.

An alternating reference voltage for the plates of tubes 52 and 53 is derived from source 55 through transformer 56 and supplied to the plates of the two tubes. Also included in the respective plate circuits of these tubes are the coils 57 and 58 of a relay indicated generally at 59. Hence, when a voltage output from the bridge circuit of one polarity sense occurs, the output of one of the tubes 52 or 53 will provide a predominating energization of the coil of the relay which is connected in the plate circuit thereof, and when a signal voltage of the opposite polarity sense is derived from the bridge circuit the other coil of the relay will have predominating strength. Both tubes may conduct continuously while the output from the bridge circuit will control which thereof provides the greater output and thereby the direction of actuation of the armature relay 59. In the embodiment shown, the armature 60 of the relay comprises two relatively insulated segments 61 and 62 which are connected respectively to opposite sides of battery 63.

The armature is adapted to engage contacts 64 and 65 when it is actuated from a neutral position in one direction, and to engage contacts 66 and 67 when it is actuated in the opposite direction. As illustrated, each of these pairs of contacts is connected to the coil 68 which constitutes the field coil of a torque motor and the contacts are connected therewith as shown so as to connect the battery 63 across the coil 68 in one or the opposite polarity sense when the armature engages one or the other pair of contacts, respectively.

In Fig. 6 I have shown a somewhat modified form of control circuit wherein an alternating current bridge is employed. The bridge circuit is substantially the same as that illustrated in Fig. 5 but is supplied from a source of alternating current 69. The output of the bridge is supplied to a phase sensitive amplifier 70 which functions in the same manner as the circuit above described in accordance with the phase sense of the signal voltage supplied thereto to supply to and control the phase relationship of current in one phase 71 of a two-phase torque motor with respect to the current in the other phase 72 thereof, and thereby to control both the direction and magnitude of torque exerted thereby. The phase 72 of the motor is connected directly across the source of alternating current while the device is in operation.

Referring again to Fig. 4, the balancing circuit and phase sensitive amplifier indicated generally at 50, which may be of the character above described in connection with Fig. 5, control the energization of a torque motor indicated generally at 73 and which comprises the field coil 68. The relay terminals of the amplifier are connected through conductors 74 and 75 with the field coil 68 as shown. The field or stator of the torque motor 73 is mounted on the gimbal ring 28, concentric with trunnion 33, and the rotor 76 thereof is secured to the trunnions 33. The rotor 76 may comprise an Alnico disc.

Assuming that the spin axis of rotor bearing case 32 tilts from the vertical about the axes of trunnions 29 and 30, tube 1 will also tilt therewith and provide a signal output which will effect, through the operation of the phase sensitive amplifier, an energization of torque motor 73 in such manner as to produce a torque about the axes of trunnions 33 and 34 and in such a direction as to cause the gyro to precess and thereby restore the spin axis to a vertical position.

Likewise, a second tube 1a similar to tube 1 is secured to the trunnion 34 in substantially the same manner relative to the rotor bearing case 32 and the spin axis of the gyro, as above described in connection with the first tube, the plane of the resistance elements within the latter tube being indicated by the dot-dash line 77. The tube is connected through conductors 78 to slip rings 79 on trunnion 34 which are engaged by brushes 80. Brushes 80 are mounted on the gimbal ring 28 and are connected through conductors 81 to slip rings 82 on the trunnion 29. Suitably supported brushes 83, engaging slip rings 82, are connected through conductors 84 to terminal block 85 and through conductors 86 to a second balancing circuit and phase sensitive amplifier 87. The relay terminals of amplifier 87 are connected through conductors 88 to block 85 and through conductors 89 to the field or stator of a torque motor indicated generally at 90. The stator is mounted on the casing 27 and concentric with the trunnion 29. This torque motor, may in all respects be similar to torque motor 73, and the rotor 91 thereof is secured to trunnion 29.

If the spin axis of rotor bearing case 32 should tilt about the axes of trunnions 33 and 34 from a vertical position, the resistors in tube 1a will experience a change in resistance thereby unbalancing the bridge circuit associated therewith and providing an output from the phase sensitive amplifier. As described in connection with amplifier 50, the phase sense of the output of amplifier 87 will depend upon the direction of tilt of the rotor bearing case and the torque motor controlled thereby will effect precession of the gyro about the axes of trunnions 33 and 34 to restore the spin axis thereof to a vertical position so far as tilt about the axes of these trunnions is concerned.

As is well known in artificial horizon instruments, the gyro vertical provides a vertical reference whereby as long as the craft on which the instrument is mounted continues in level flight, the horizon bar is aligned with the diametrically opposed lubber lines on opposite sides of the scale of the instrument, and any departure of the craft from level flight either in pitch or roll will effect, in the first instance, relative vertical movement of the horizon bar and lubber lines or, in the second case, relative angular rotation between the horizon bar and lubber lines, or a combination of these movements if pitch and roll occurs.

In Figs. 7 and 8, I have disclosed a modified form of artificial horizon instrument. In Fig. 7, the casing has been eliminated to clarify the showing, but it will be understood that bearings 92 are suitably mounted within the case 73 shown in Fig. 8. A gimbal ring 94 or other similarly supported member is fixed to trunnions 95 and 96 which are journaled in bearings 92. A shaft 97, the axis of which extends at right angles to the coincident axes of trunnions 95 and 96, is suitably journaled in the gimbal ring 94.

In a similar manner to that above described in connection with Fig. 4, a mask 98 is connected by a bracket 99 to the gimbal ring 94 and an horizon bar 100, connected with arm 101, is mounted to move in cooperable relationship to dial 102 (see Fig. 8) which bears the diametrically opposed lubber lines 103. The arm 101 is secured to and pivots with the shaft 97, being counterbalanced by the weight 104.

A tube 1b, of the character of tube 1, is secured on the shaft 97 with the plane of the resistance elements therewithin, as represented by the dot-dash line 105, lying normal to the axis of shaft 97. The resistors of tube 1b are connected through conductors 106 to a balancing circuit and phase sensitive amplifier 107. The output of the amplifier is connected through conductors 108 to the field of a motor 109, the stator of which is secured to and supported on the gimbal ring 94 and the rotor of which is secured to shaft 97.

Similarly, a second tube 1c, similar to tube 1, is mounted on the gimbal ring or on trunnions 95 and 96 to rotate with the gimbal ring about the coincident axes of these trunnions, the plane of the resistance elements therein represented by the dot-dash line 110, lying substantially normal to the axes of the trunnions 95 and 96. The resistance elements of tube 1c are connected through conductors 111 to a second balancing circuit and phase sensitive amplifier 112, the output of which is connected through conductors 113 to a motor 114. The stator of motor 114 is preferably mounted on the bearing 92 and the rotor thereof is secured to trunnion 96.

With the above described construction, any tilt of the gimbal ring 94 about the axis of trunnion 96 from a horizontal position will produce a signal voltage output from the bridge circuit including the tube 1c, and the amplifier, depending upon the direction of tilt and the polarity sense of the output signal from the bridge circuit, will energize motor 114 to restore the gimbal ring 94 to a horizontal position so far as tilt thereof about the axes of trunnions 95 and 96 is concerned. Likewise, any tilt of shaft 97 about its own axis, causing the bisector of the angle formed between the resistances within the tube 1b to deviate from vertical so far as rotation about the axis of shaft 97 is concerned, will control the phase sensitive amplifier 107 to effect energization of motor 109 and restore said bisector to a vertical position. Since the arm 101 pivots with the shaft 97 about its axis and also pivots with the gimbal ring 94 about the axes of trunnions 95 and 93, and also since the tubes 1b and 1c and their associated circuits and motors function to maintain a vertical reference substantially in the same manner as the gyroscopic instrument of Fig. 4, the horizon bar 100 will provide a reference from which a change in the attitude of a craft either in pitch or roll may be determined.

As shown in Fig. 8, a mask 98 may be provided with an indicator 113 which will move with the gimbal ring 94 about the axes of trunnions 95 and 96 relative to the case, and cooperates with the calibrations 114 on the scale 102 to provide an indication of the degree of bank or roll of the craft on which it is mounted.

It will be understood that the particular arrangements of the tilt detecting means of my invention with respect to the gyroscope or members with which they are associated as herein illustrated and described, are intended in the main for illustrative purposes and the relative arrangements thereof may be varied as desired, provided the desired indication of tilt about the respective axes is obtained. Furthermore, the phase sensitive amplifier circuits herein disclosed are mainly illustrative and may be varied to meet conditions and requirements. The balancing and amplifier circuits employed in the last described embodiment of my invention preferably include means for integrating or averaging the signal voltages as hereinbefore described, and furthermore, the amplifier systems or the motors or both preferably include some damping means to render the device stable in operation.

In Fig. 9, I have shown a schematic representation of one form of tube for my inclinometer wherein the tube 115 comprises two relatively angularly disposed envelope portions 116 and 117 in each of which is disposed a substantially straight, wire-like resistance element. The resistance 118 is electrically connected at one end with resistance 119 at a common terminal support and these resistors are adapted to be connected in respective arms of a bridge or balanced circuit. Fig. 10 illustrates a socket support 120 for a pair of tubes 121 each of which contains but a single resistance element 122. The support is adapted for mounting on a trunnion of the gyroscope, being provided with opening 123 to receive the trunnion and set screw 124 to secure it in position thereon. The support is provided with two sockets adapted to receive and support tubes 122 so that the resistors therein lie at a given angle with respect to each other as shown. Electrical connections to the tubes are established through terminals 125.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A device for providing a directional reference relative to vertical comprising a member, means for pivotally supporting said member to pivot in a vertical direction about an axis, means for orienting said member about said axis, tilt-detecting means supported to pivot in a vertical direction with said member and comprising a closed envelope containing a fluid, an extremely fine electrical resistance element supported within said envelope and wholly immersed in said fluid and directly subjected only to self-generated heat, said resistance element being mounted to provide relatively angularly disposed portions adapted for energization from a source of electrical energy and said fluid exhibiting sufficient inertia under external acceleration forces as to affect the resistance of said resistance element, and the size of the resistance element and the nature and amount of fluid within the envelope being so selected that movement of the fluid within the envelope caused solely by convection due to heat of the resistance element and by the effect of external forces on the mass of the fluid results in measurable changes in the resistance of the resistance element, a balancing circuit connected with said tilt-detecting means, and means for connecting the output of said balancing circuit in controlling relation to said member-orienting means.

2. A device of the character recited in claim 1 in which the fluid is a gas and the means for producing vertically rising convective streams and for undergoing a change in an electrical characteristic thereof is a pair of relatively angularly disposed resistance elements adapted to vary in resistance with variations in inclination thereof with respect to vertical.

3. The combination with a member adapted to pivot in a vertical direction about an axis, tilt-detecting means adapted to be mounted thereon and to pivot therewith comprising a closed envelope containing a fluid, an extremely fine electrical resistance element supported within said envelope and wholly immersed in said fluid and directly subjected only to self-generated heat, said resistance element being mounted to provide relatively angularly disposed portions adapted for energization from a source of electrical energy and said fluid exhibiting sufficient inertia under external acceleration forces as to affect the resistance of said resistance element, and the size of the resistance element and the nature and amount of fluid within the envelope being so selected that movement of the fluid within the envelope caused solely by convection due to heat of the resistance element and by the effect of external forces on the mass of the fluid results in measurable changes in the resistance of the resistance element, a balancing circuit having the relatively angularly disposed portions of said resistance element connected therein, a source of electrical energy for energizing said circuit, means for orienting said member about said axis, and means for connecting the output of said balancing circuit in controlling relation to said member-orienting means.

4. A device of the character recited in claim 3 in which the fluid is a gas.

5. In a gyroscopic instrument comprising a rotor bearing case, a gimbal ring supported to rotate about a first normally horizontal axis and for supporting said case to pivot about a second normally horizontal axis normal to said first axis, a torque motor for causing said case to pivot about one of said axes, tilt-detecting means for controlling the operation of said torque motor comprising a closed envelope containing a fluid, an extremely fine electrical resistance element supported within said envelope and wholly immersed in said fluid and directly subjected only to self-generated heat, said resistance element being mounted to provide relatively angularly disposed portions adapted for energization from a source of electrical energy and said fluid exhibiting sufficient inertia under external acceleration forces as to affect the resistance of said resistance element, and the size of the resistance element and the nature and amount of fluid within the envelope being so selected that movement of the fluid within the envelope caused solely by convection due to heat of the resistance element and by the effect of external forces on the mass of the fluid results in measurable changes in the resistance of the resistance element, said tilt-detecting means being mounted to pivot with said case and with the relatively angularly disposed portions of said resistance element lying at an acute angle to but respectively on opposite sides of vertical when said case lies approximately in the position it is to be maintained in by said tilt-detecting means, and means responsive to a change in the relative resistance values of the angularly disposed portions of said resistance element for controlling the operation of said torque motor.

6. A gyroscopic instrument of the character recited in claim 5 in which the fluid is a gas.

7. In a device adapted to control a motor, the combination with tilt-detecting means including a closed envelope adapted to be mounted to pivot with a member, said envelope being filled with a fluid having sufficiently high molecular weight as to exhibit appreciable inertia to acceleration forces, and said envelope containing therewithin, as the sole essential tilt-detecting means, regularly angularly disposed electrical means fixed against movement relatively to said envelope and wholly immersed in said fluid and adapted to undergo a change in an electrical characteristic thereof when their positions relative to vertical are varied, said electrical means forming an acute angle therebetween and adapted to lie on opposite sides of vertical when mounted for tilt-detecting purposes, of means responsive to changes in the said electrical characteristic of said electrical means for controlling said motor.

8. A device of the character recited in claim 7 in which the fluid is a gas of relatively high molecular weight.

9. In an inclinometer of the character described, the combination with an electrical circuit including two halves adapted to be balanced in resistance, of tilt-detecting means comprising a closed envelope containing a fluid, an extremely fine electrical resistance element supported within said envelope and wholly immersed in said fluid and directly subjected only to self-generated heat, said resistance element being mounted to provide relatively angularly disposed portions adapted for energization from a source of electrical energy and said fluid exhibiting sufficient inertia under external acceleration forces as to affect the resistance of said resistance element, and the size of the resistance element and the nature and amount of fluid within the envelope being so selected that movement of the fluid within the envelope caused solely by convection due to heat of the resistance element and by the effect of external forces on the mass of the fluid results in measurable changes in the resistance of the resistance element, the relatively angularly disposed portions of said resistance element being respectively connected in the two halves of said circuit, a motor, and means for connecting the output of said circuit in controlling relation to said motor.

10. An inclinometer of the character recited in claim 9 in which the fluid is a gas having high inertia.

11. In an inclinometer of the character described, a bridge circuit, tilt-detecting means comprising a closed envelope containing a fluid, an extremely fine electrical resistance element supported within said envelope and wholly immersed in said fluid and directly subjected only to self-generated heat, said resistance element being mounted to provide relatively angularly disposed portions adapted for energization from a source of electrical energy and said fluid exhibiting sufficient inertia under external acceleration forces as to affect the resistance of said resistance element, and the size of the resistance element and the nature and amount of fluid within the envelope being so selected that movement of the fluid within the envelope caused solely by convection due to heat of the resistance element and by the effect of external forces on the mass of the fluid results in measurable changes in the resistance of the resistance element, a source of electrical energy connected across said bridge circuit, and utilization means connected with the output of said bridge circuit.

12. In an artificial horizon instrument, a member, means for supporting said member to rotate about a normally horizontal axis of support, a motor for rotating said member about said axis, tilt-detecting means mounted to move with said member about said axis, said tilt-detecting means comprising a pair of relatively angularly disposed resistance elements enclosed in an envelope filled with a fluid, said pair of elements extending generally vertically and forming therebetween an acute angle and normally lying on opposite sides of the vertical when said member is vertically disposed, and means electrically connected with said motor and said pair of elements for controlling the operation of said motor in response to differential changes in resistance of said pair of elements.

13. An artificial horizon instrument of the character recited in claim 12 in which the fluid is a gas of relatively high molecular weight.

14. In an artificial horizon instrument, a member, means for supporting said member to rotate about mutually perpendicular axes, a first motor means for rotating said member about one of said axes and a second motor means for rotating said member about the other of said axes, a pair of tilt-detecting means mounted to move with said member respectively about each axis, said tilt-detecting means each comprising a closed envelope filled with a gas and containing, as the sole essential tilt-detecting means, a pair of relatively angularly disposed resistance elements fixed against angular movement relative to said envelope and arranged at acute angles to the vertical when said axes lie in a horizontal plane, and means respectively associated with said tilt-detecting means and including means responsive to differential changes in resistance of said resistance elements due to changes in position thereof relative to vertical for controlling the operation respectively of said motor means.

15. In an artificial horizon instrument, a member, means for supporting said member to rotate about mutually perpendicular axes of support, a first motor means for rotating said member about one of said axes and a second motor means for rotating said member about the other of said axes, tilt-detecting means mounted to move with said member about said axes, said tilt-detecting means comprising relatively angularly disposed resistance elements enclosed in an envelope filled with a fluid, the elements of each pair of said elements extending generally vertically and forming therebetween an acute angle and lying on opposite sides of a vertical plane including one of said axes when said axes lie in a horizontal plane, and means electrically connected with one of said motor means and one pair of said elements, respectively, for controlling the operation of said motor means in response to differential changes in the resistance of said pairs of elements, the tilt-detecting means for detecting tilt about one axis being arranged to control the motor means for rotating the member about the same axis.

HUGH E. WEBBER.

REFERENCES CITED

The following references are of record in the file of this patent:

UNITED STATES PATENTS

| Number | Name | Date |
| --- | --- | --- |
| 898,766 | Mott | Sept. 15, 1908 |
| 1,317,072 | Carlier | Sept. 23, 1919 |
| 1,318,196 | Case | Oct. 7, 1919 |
| 1,419,010 | Brown | June 6, 1922 |
| 1,679,354 | Fairchild et al. | Aug. 7, 1928 |
| 1,773,172 | Davis | Aug. 19, 1930 |
| 1,822,184 | Wunsch | Sept. 8, 1931 |
| 1,841,607 | Kollsman | Jan. 19, 1932 |
| 2,193,910 | Wilson | Mar. 19, 1940 |
| 2,278,379 | Koster | Mar. 31, 1942 |
| 2,367,465 | Kunzer | Jan. 16, 1945 |
| 2,380,538 | Meredith | July 31, 1945 |

FOREIGN PATENTS

| Number | Country | Date |
| --- | --- | --- |
| 215,979 | Switzerland | Nov. 1, 1941 |
| 361,204 | Italy | July 15, 1938 |